April 22, 1969
J. E. McCULLOUGH ETAL
3,440,390
METHOD AND APPARATUS FOR TREATING CONTINUOUS
STRIP MATERIAL UNDER VACUUM
Filed April 20, 1966
Sheet 1 of 2
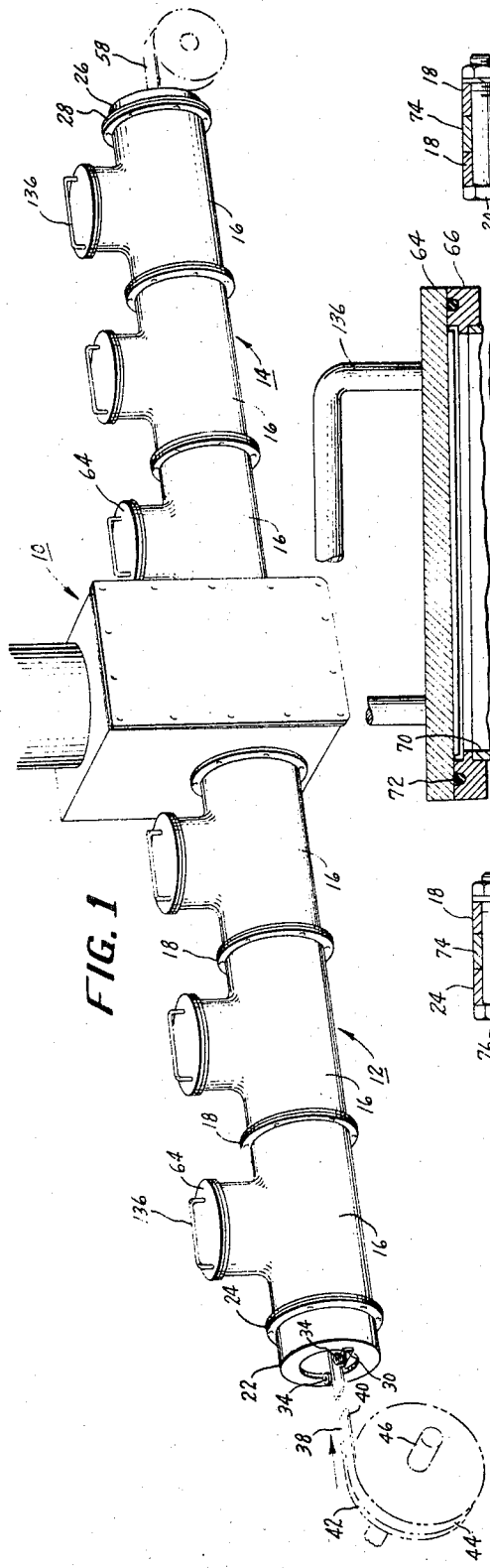
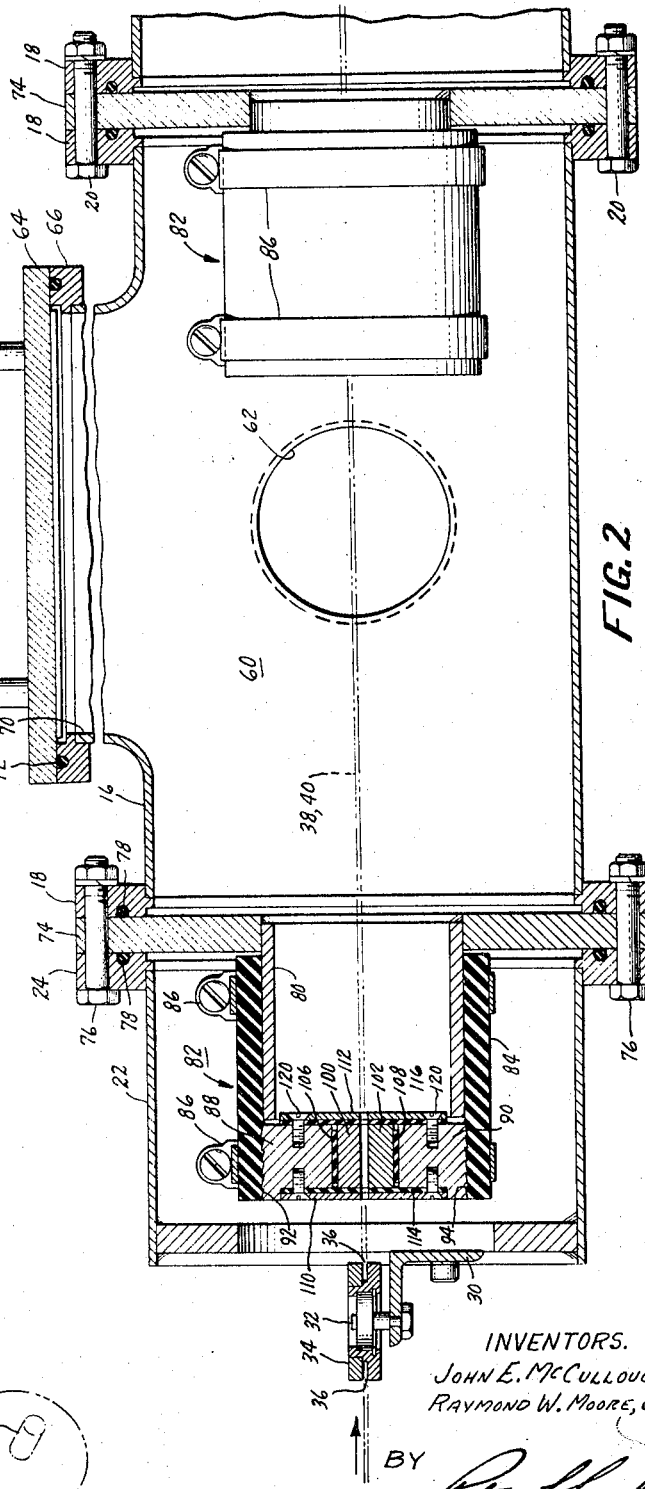
INVENTORS.
John E. McCullough,
Raymond W. Moore, Jr.
BY
ATTORNEY

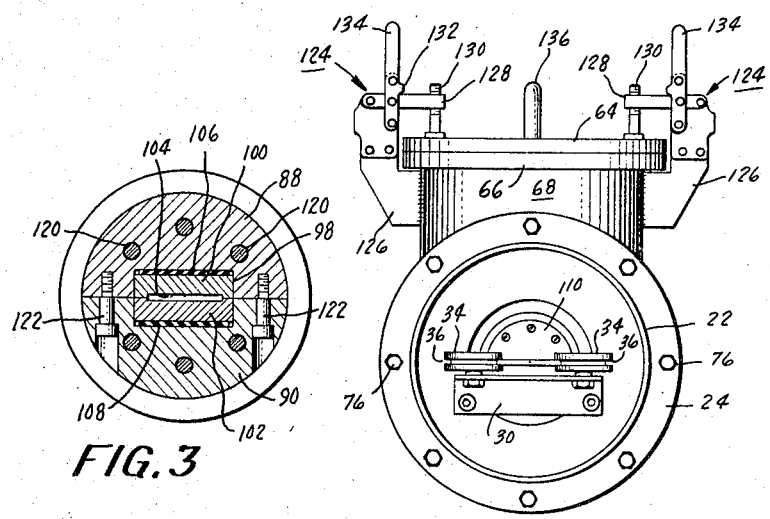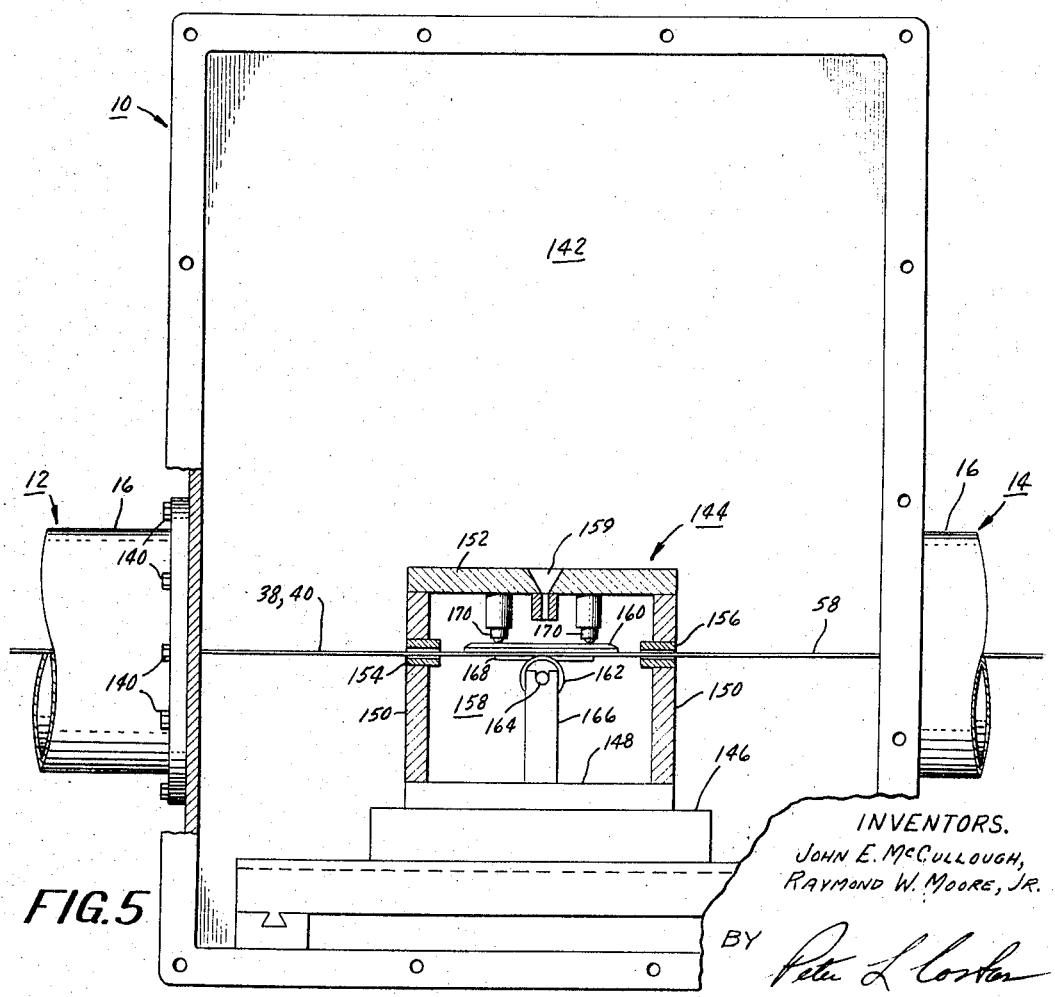

United States Patent Office 3,440,390
Patented Apr. 22, 1969

3,440,390
METHOD AND APPARATUS FOR TREATING CONTINUOUS STRIP MATERIAL UNDER VACUUM
John Engstrom McCullough, Carlisle, and Raymond William Moore, Jr., Brookline, Mass., assignors to Arthur D. Little, Inc., Cambridge, Mass., a corporation of Massachusetts
Filed Apr. 20, 1966, Ser. No. 543,901
Int. Cl. B23k 15/00
U.S. Cl. 219—121        17 Claims

ABSTRACT OF THE DISCLOSURE

An apparatus for electron beam welding of a pair of continuous strip materials positioned in edge abutting relationship under a vacuum includes receiving and discharging assemblies through which the strip passes and each comprised of a plurality of vacuum chambers with the air pressure decreasing towards the vacuum processing chamber between the receiving and discharging assemblies. Between the adjacent vacuum chambers is a pair of split housing members providing a mounting aperture in which is disposed a pair of sealing members with resilient means therebetween to provide a resilient support for the sealing members. The sealing members provide an aperture therebetween for passage of the strip therethrough.

---

The present invention relates to the treatment of continuous strip material and, more particularly, to a method and apparatus for processing continuous strip material under vacuum which is especially adapted to welding with a beam of high-energy charged particles.

In recent years it has been found highly desirable to weld metals of dissimilar chemical composition by use of a beam of electrons which are focused at the abutting edges of the material to be welded so as to minimize the area of metal involved in the weld and minimize heat distortion of the metals and loss of the desirable properties of the separate metal elements. Even more recently, it has been proposed to utilize a beam of high-energy protons as the means of supplying energy to form the weld, and the use of high-energy electrons or protons is generically encompassed by the term "high-energy charged particles."

Because welders utilizing such high-energy charged particles require a relatively high vacuum for efficient operation, efforts to provide such apparatus for the welding of continuous strip material generally have relied upon the use of large vacuum chambers for housing the coils of the material to be welded and related apparatus for moving the strip material past the welding beam. Since the size of the coils which may be treated are limited by the size of the vacuum chamber, such a process is relatively expensive and time-consuming since it is necessary to first load the vacuum chamber, draw the vacuum, weld the amount of material that has been placed therein, remove the material, reload, etc. Moreover, since the welding material will oftentimes be quite brittle, coiling of the welded material as would be required in such a batch operation is highly undesirable.

It is an object of the present invention to provide a novel method and apparatus for treating continuous strip material under a vacuum which are simple and relatively efficient to operate and which are readily adaptable to variations in the dimensions of the material being treated.

It is also an object of the present invention to provide such apparatus for treating continuous strip material under vacuum which utilizes a construction which is relatively simple and rugged, which is relatively economical to fabricate, and which is relatively simple to repair or modify.

A specific object of the present invention is to provide such a method and apparatus wherein a pair of continuous strips of metal are passed in abutting engagement through a work processing chamber in which a beam of high-energy charged particles is focused onto the abutting edges to effect a weld thereof.

A further object is to provide a novel sealing assembly which is rugged in construction, simple to fabricate and relatively efficient in minimizing the leakage of air about a strip of material passing continuously therethrough.

Other objects and advantages will be readily apparent from the following detailed specification and the attached drawings wherein:

FIGURE 1 is a fragmentary perspective view of an electron-beam welding apparatus embodying the present invention;

FIGURE 2 is a sectional view in elevation of a portion of the electron-beam welding apparatus of FIGURE 1 to an enlarged scale;

FIGURE 3 is a sectional view along the line 3—3 of FIGURE 2;

FIGURE 4 is an end elevational view of the apparatus of FIGURE 1 to an enlarged scale; and FIGURE 5 is a fragmentary sectional view of the electron-beam welding chamber of the apparatus of FIGURE 1 to an enlarged scale.

It has now been found that the foregoing and related objects may be readily attained in an apparatus for treating continuous strip material under a vacuum which includes a work unit providing a vacuum processing chamber in which the continuous strip material may be treated, a receiving assembly having a passage extending therethrough communicating with the atmosphere on its inlet side and with the processing chamber on its outlet side, and a discharging assembly having a passage extending therethrough communicating with the processing chamber on its inlet side and with the atmosphere on its outlet side. The receiving assembly is adapted to receive continuous strip material at atmospheric pressure at its inlet side and to discharge the continuous strip material under a partial vacuum into the processing chamber for work thereon, and includes a plurality of vacuum inlet chambers in which the air pressure is decreased toward the processing chamber. Similarly, the discharging assembly is adapted to receive the continuous strip material from the processing chamber under a partial vacuum at its inlet side and to discharge the continuous strip material to atmospheric pressure at its outlet side, and it, too, includes a plurality of vacuum outlet chambers wherein the air pressure increases toward the outlet thereof.

Sealing means are provided between adjacent inlet and outlet chambers and have a pair of sealing members with opposed surfaces forming an aperture for the passage of the continuous strip material therethrough and minimizing air leakage therethrough about the strip material while permitting sliding movement of the continuous strip material. Evacuating means communicate with the inlet and outlet chambers for removing air therefrom to establish the desired decrease in pressure toward the work processing chamber from the atmosphere in both the receiving and discharging assemblies.

To accommodate variations in the thickness of the strip material passing therethrough, the opposed faces of the pair of sealing members have aligned grooves therein forming the aperture for the passage of the continuous strip material and the sealing means additionally includes means resiliently supporting the sealing members to permit movement thereof generally normal to the strip material. In this manner, when the strip material is of temporarily greater thickness, the sealing members may be forced apart against the resilient supporting means which will then return the sealing members to their initial position when the thickness of the strip material is decreased.

In accordance with the preferred aspect of the present invention, the sealing means includes a pair of split housing members configured to provide a mounting aperture therebetween and the resilient supporting means is disposed within the mounting aperture. The pair of sealing members is also disposed within the mounting aperture with the resilient supporting means providing the resilient support for the sealing members to permit the movement thereof generally normal to the strip material within the mounting aperture. Although various types of resilient supporting means may be employed, a highly satisfactory arrangement has been one employing resiliently deflectable sheet material therefor which is placed between the remote faces of the sealing members and the split housing members.

The sealing members may be fabricated from hard wear-resistant metal in order to obtain a highly desirable degree of wear-resistance and long trouble-free operation. As will be readily apparent, the sealing members define the through aperture for the continuous strip material and thus may be interchanged to accommodate strip materials of various dimensions. The grooves provided in the opposed faces of the sealing members are generally of rectangular configuration or cross-section; and they may be of constant dimension throughout the path of movement of the strip material therethrough or they may be so dimensioned and configured as to provide a narrower rectangular cross-section adjacent the side thereof which is closest to the atmosphere. By providing a tapering cross-section, any tendency for wear may be minimized while still retaining the close surface contact of the walls defining the aperture through the sealing members and the strip material.

In order to facilitate passage of the strip material through the apparatus and to insure proper alignment where required within the processing chamber as well as in passage of the strip material through the sealing means, the receiving assembly is provided with guide means adjacent the inlet side of the passage therein and the discharging assembly has cooperating guide means adjacent the outlet side of the passage therein. Although the guide means may take the form of stationary members, desirably rotatable guide wheels are provided so as to minimize any frictional contact or drag upon the continuous strip material passing therethrough thus facilitating optimum speed of operation of the apparatus. For example, in guide means for use in the handling of a pair of strips for welding within the apparatus, a pair of cooperating guide wheels having opposed grooves therein desirably receive the pair of strips within the grooves therein and maintain the opposed edges of the strips in abutting contact so that they will pass easily through the sealing means and be in the desired alignment for the welding operation. Moreover, in such a welding operation where proper alignment of the two strips is necessary, the work processing chamber is also provided with guide means in the form of a fixture which insures the proper alignment of the two strips for the welding beam.

In accordance with the preferred aspect of the present invention, gasket members are provided over both the inner and outer surface of the sealing means so as to gasket the juncture of the split housing members and the sealing members and prevent any possible air leakage therethrough. Although the gasket may be fixedly mounted thereon, desirably gasket retaining means are releasably engaged with the split housing members. To insure proper alignment of the sealing members and the split housing members as well as to maintain assembly thereof, releasable fasteners may extend therein normal to the path of travel of the strip material.

In accordance with a highly desirable aspect of the present invention, the work unit and vacuum processing chamber in which the continuous strip material is to be treated is one which provides a beam of high-energy charged particles, conveniently an electron-beam welding unit. As is well known, the beam of high-energy charged particles is focused onto the abutting edges of the continuous strips which are to be welded and its intensity is regulated to form a narrow, highly heated channel at the place of impingement and to insure that a predetermined or certain minimum density of the particles will penetrate into the body of the material and to the desired depth. As the beam penetrates into the body of the metallic components, the charged particles simultaneously yield their energy throughout the depth of penetration to melt the metal struck by the beam and closely adjacent thereto so that the metal of the two components flows together to provide a proper weld fusion along the abutting surfaces in a very narrow channel. Since only a narrow channel is involved and the thermal conductivity of the metal does not affect the welding speed, the beam may rapidly traverse the length of the abutting strips at comparatively high speed with a minimum of thermal stress in the welded strip, thus permitting rapid operation. The technique of welding using high-energy electrons as the charged particles is well described in patents and literature and further description may be obtained therefrom. Since the welded strip material may tend to be very brittle depending upon the metallic nature of the separate strips which are welded together, the discharging assembly and receiving assembly are substantially aligned so as to provide a path of movement therethrough which is substantially rectilinear as contrasted with that which would occur in the use of roller seals and the like.

To facilitate construction of an apparatus, the sealing means desirably includes a tubular member which is mounted at one end on a casing member providing a single vacuum chamber. The pair of split housing members are then mounted within the other end of the tubular member. In accordance with one aspect, the tubular member may be provided by a relatively rigid cylindrical element which in turn is supported upon a seal mounting plate bolted or otherwise removably secured to the casing member and a relatively flexible but substantially air-impermeable cylindrical member having one end fitted thereover and receiving the split housing members at its other end. Accordingly, each of the receiving and discharging assemblies is comprised of a plurality of casing members providing vacuum chambers, each of which is also provided with a fitting for connection to means for drawing a vacuum. To facilitate maintenance and operation of the apparatus, the casing members are desirably provided with a removable cover which thus establishes an opening for access to the vacuum chamber and means are also provided for securing the casing member to the adjacent component of the apparatus.

Each of the separate vacuum chambers may be connected to a suitable source for drawing a vacuum therein in accordance with the most effective operation of the apparatus. However, it is also possible to connect the vacuum drawing means to less than all of the vacuum chambers depending upon the number thereof and the level of vacuum desired. Similarly, additional connection may be provided between the work processing chamber and a suitable source of vacuum to further implement operation of the apparatus. The number of vacuum chambers required will, of course, be dependent upon the efficiency of the construction of the sealing means as well as the desired degree of vacuum within the work processing chamber. Generally, three or more separate sealing means will be required to establish a highly desirable degree of vacuum for use in electron-beam welding.

Referring now in detail to the attached drawings, therein illustrated is an apparatus embodying the present invention for the continuous electron-beam welding of strip material which utilizes an electron-beam welding unit generally designated by the numeral 10. Communicating with either side thereof are a receiving assembly and a discharging assembly which are generally designated by the numerals 12, 14 respectively and comprised of three casing members 16 which have mounting flanges 18 seating fasteners 20.

At the outer end of the receiving assembly 12 as a guide housing 22 with a mounting flange 24 for securing it to the adjacent casing member 16. At the outer end of the discharging assembly 14 is a similar guide housing 26 with a mounting flange (not shown). On a bracket 30 at the outer end of the guide housing 22 is mounted a pair of shafts 32 which rotatably carry guide wheel assemblies 34 with grooves 36 therein which guide continuous strips 38 and 40 to be welded together with the opposed edges in generally abutting relationship from the feed rolls 42, 44 on the shaft 46 and into the guide housing 22. A similar pair of shafts and guide wheel assemblies (not shown) mounted on the guide housing 26 guide the welded strip 58 outwardly from the discharging assembly 14.

As best seen in FIGURE 2, each of the several casing members 16 provides a vacuum chamber 60 therewithin and has an aperture 62 to one side thereof surrounded by a suitable fitting (not shown) through which the chamber 60 is connected to a suitable pump (not shown) for drawing a vacuum therein.

A cover 64 is sealingly engaged with an annular flange 66 mounted on an upwardly extending cylinder neck portion 68 of the casing member 16 so as to provide a relatively large bore 70 to facilitate inspection of the work within the vacuum chamber 60. An O-ring member 72 provides an air-tight seal between the cover 64 and annular flange 66 to facilitate maintenance of a vacuum in the chamber 60.

On the inlet side of the casing member 16, a seal mounting plate 74 is disposed between the annular flanges 18, 24, so that the fasteners 76 secure the assembly together. In order to provide an air-tight seal between these parts and facilitate establishment of a vacuum in the chamber, O-rings 78 are provided in each of the flanges 18 and 24 for sealing engagement with the mounting plate 74.

Secured to the mounting plate 74 is a cylindrical mounting tube 80 which extends outwardly toward the inlet side of the receiving assembly and which carries the sealing means generally designated by the numeral 82. A vacuum hose 84 of gum rubber or the like is snugly fitted over the end of the mounting cylinder 80 and is held in place thereon by the hose clamp 86. At the inlet end of the vacuum hose 84, a pair of split housing members 88, 90 is mounted therein and is retained in place by engagement of the threaded portions 92, 94 respectively on the hose 84 and split housing members 88, 90, as well as the hose clamp 96.

As best seen in FIGURE 3, the opposed faces of the split housing members 88, 90, have generally rectangular grooves 98 therein forming a rectangular aperture wherein are disposed a pair of rectangular sealing members or sealing inserts 100 and 102 of hard, wear-resistant metal alloy. Each insert 100, 102, has an aligned rectangular groove milled in its opposed surface so as to cooperate in providing a rectangular aperture 104 through which the continuous strip material may pass with a minimum of air leakage. If so desired, the grooves may taper to a greater depth along the line of travel into the vacuum chamber 60. The dimensions of the seal aperture 104 closely approximate that of the continuous strips 38, 40 so that there will be a minimum of air leakage into the vacuum chamber 60.

Support pads 106 and 108 of resilient sheet material are provided between the metal sealing inserts 100 and 102 and the split housing members 88, 90, to provide a resilient mounting and allow for minor variation in the thickness of the continuous strips 38, 40. Gasket members 114 and 116 are disposed on the opposite surfaces of the split housing members 88, 90 and sealing inserts 100, 102 to insure an air-tight assembly thereof and have aperture 118 therein which align with the seal aperture 104. Disc-shaped retainer plates 110, 112 are placed over the gasket members 114, 116 to secure them tightly in position, and this assemblage is held together by the fasteners 120. The fasteners 122 extend normally to the seal inserts 100, 102 and split housing members 88, 90 to maintain this assemblage in alignment.

The vacuum sealing means 82 is readily repaired by removal of the hose clamp 96 with withdrawal of the sealing means 82 from the end of the hose 84. The removal of the fasteners 120 and 122 frees the metal seal inserts 100, 102 and support pads 106, 108 as well as the gasket members 114, 116 to enable replacement when they have been worn or when a size change is desired to accommodate a different size of strips.

As seen in FIGURE 4, the vacuum sealing means 82 within the casing members 16 is readily accessible by removal of the cover 64 which is held in position on the neck portion 68 by a pair of readily operable toggle clamps generally designated by the numeral 124. Each of the clamps 124 has a base 126 on the neck portion 68 of the casing member 16, and an arm 128 which is pivotably mounted at one end thereon and which has an adjustable bolt 130 threadably mounted at the other end thereof for clamping down the cover 64. The arm 128 in turn is secured in place by the boss 132 on the lever 134 which is pivoted at its one end to the base 126. Pivoting of the lever 134 into vertical position locks the cover 64 tightly against the flange 66 and pivoting it outwardly into a horizontal position releases the arm 128 and bolts 130 so that the cover 64 may be removed by manually grasping the handle 136 thereon.

In the receiving assembly 12, the vacuum sealing means 82 are mounted at the entrance side of the several casing members 16 and their respective vacuum chambers 60 so that the first sealing means 82 in the path of travel of the strips 38, 40 is on the guide housing 22, the second in the first of the vacuum chambers 60, etc., as seen in FIGURE 2. In the discharging assembly 14, the sealing means 82 are mounted at the discharge side of the several casing members 16 and their respective vacuum chambers 60 so that the last sealing means 82 in the path of travel of the welded strip 58 is in the guide housing 26. Thus, the several sealing means are between their respective vacuum chambers 60 and the atmosphere.

The innermost casing members 16 of the receiving assembly 12 and discharging assembly 14 are bolted to the housing 138 of the welding unit 10 by fasteners 140. If so desired, this connection may include a mounting plate 74 for a sealing means 82 to limit further air leakage from the innermost vacuum chambers 60 in the receiving and discharging assemblies 12, 14 into the work processing chamber 142 therein which may also be connected to an evacuation pump through a fitting (not shown).

In the work processing chamber 142 is a welding fixture generally designated by the numeral 144 which is mounted on a base 146 and which has a bottom wall 148, side walls 150 and a top wall 152. The continuous strips 38, 40 enter the welding fixture 144 through the inlet guide 154 and the welded strip 58 departs through the outlet guide 156. The continuous strips 38, 40 are positioned within the welding chamber 158 of the fixture 144 in proper alignment with an electron beam passing through the beam inlet 159 in the top wall 152 by a rear strip guide wheel 160 rotatably mounted on a shaft (not shown), a front strip guide wheel (not shown) also mounted on a shaft (not shown), and a bottom guide roller 162 which has its shaft 164 supported in the roller housing 166. The guide wheels have lip portions 168 which overlap the remote edge portions of the strips 38, 40 and are spaced apart so as to allow the electron beam to pass thereby and focus on the abutting edges of the strips 38, 40. The ball plungers 170 apply pressure to the guide wheels which in turn press the strips 38, 40 against the guide roller 162 which extends underneath.

Since the general construction of electron-beam welding equipment is amply disclosed in Steigerwald United States Patent No. 2,793,281, granted May 21, 1957, and in other patents and publications, the structure thereof is not shown here to avoid excessive illustration. However, it will be appreciated that the focused beam of electrons is focused onto the abutting edges of the strips 38, 40 and desirably an optical viewer may be provided for this purpose. If so desired the welding fixture 144 may be movably mounted within the work processing chamber 142 for slight adjustments.

Referring now to the operation of the apparatus, the strips 38, 40 of material to be welded are drawn through a bath of suitable solvent (not shown) or any other suitable cleaning means and into abutting engagement within the grooves 54 of the wheel assemblies 52 of the guide housing 22. The strips 38, 40 which are in proper disposition now pass into the sealing aperture 104 defined by the seal inserts 100, 102 of the first sealing means 82. The strips 38, 40 then pass into the vacuum chamber 60 of the first casing member 16 from which air is being evacuated through the aperture 62 by means of a suitable pump (not shown).

As the strips 38, 40 continue to travel, they pass through the sealing means 82 of the next casing member 16 into its vacuum chamber 60 which is being similarly evacuated to an even lower pressure, and thence into the third casing member 16 where the pressure is even further reduced. Finally the strips 38, 40 pass into the work processing chamber 142 of the welding unit 10 wherein they are firmly positioned in proper abutting contact by the welding fixture 144. In the welding fixture the rear strip guide wheel 160 and the front strip guide wheel (not shown) effect proper alignment in combination with the bottom guide roller 162 and firm contact is ensured by the ball plungers 170.

A beam of high-energy charged particles enters the work processing chamber 142 and passes through the beam inlet 159 of the welding fixture 144 and focuses onto the abutting edges of the two strips 38, 40.

The high-energy charged particles give up their energy to the surrounding metal effecting localized melting thereof and thus fusion of the abutting edges of the two strips to form a welded, composite strip 58 which passes outwardly of the work processing chamber 142 into the vacuum chamber 60 of the first casing member 16 of the discharging assembly 14. In this casing member 16 air is being withdrawn through the aperture 62 to maintain a low pressure therein to facilitate optimum operation within the work processing chamber 142. The welded strip 58 then passes through the seal aperture 104 of the sealing means 82 into the next vacuum chamber 60 of the adjacent casing member 16, and from there into the vacuum chamber 60 through a further sealing means 82. From the last of the casing members of the discharging assembly 14, the welded strip 58 passes through the last of the sealing means 82 into the guide housing 26 which carries the guide wheel assembly 34 for maintaining alignment of the welded strip 58 within the seal apertures 104 of the several sealing means 82 of the discharging assembly 14.

If so desired the welded strip 58 may then be heat treated or subjected to any desired finishing operation before being coiled. However, it will be noted that the welded strip travels substantially rectilinearly throughout the discharging assembly to avoid any undue bending thereof which might produce fracturing of the relatively brittle weld.

In practice, it has been found that three independently evacuated vacuum chambers 60 may operate efficiently in the receiving assembly 12 and discharging assembly 14 with individual pumps (not shown) drawing approximately 40 cubic feet of air per minute. Generally, the seal aperture 104 should provide a clearance of only about 0.002–0.010 inch to minimize air leakage about the strip material 38, 40. The vacuum in the first vacuum chamber 60 of the receiving assembly 12 would generally be on the order of 30–40 millimeters of mercury and the pressure within the work processing chamber 142 may actually be maintained below 1 micron of mercury.

In one desirable embodiment of the present invention, a relatively wide strip of carbon steel is welded to a tool steel designated as "M2" or "M3" to produce a composite strip 58 of highly desirable properties for use in the manufacture of saw blades. The tool steel provides the toothed edge of the blade and the carbon steel provides a relatively flexible and tough backing. By use of the continuous strip welding method of the present invention, the composite strip 58 thus produced has a minimal area of the two component strips involved in the formation of the weld so as to minimize any undue effect upon the properties thereof, and relatively large lengths may be utilized for fabrication of band saw blades.

When it is desired to repair the sealing means 82 or to change the seal inserts 100, 102 to accommodate strip material of different dimensions, the operator need only shut off the apparatus, open the clamps 124 and remove the cover 64 from the top of the casing member 16. He may then gain access to the sealing means 82 and release one or both of the hose clamps 86, 96 depending upon whether it is desired to remove the hose 84 itself. The assembly of the split housing members 88, 90 may then be rotated to remove it from the end of the hose 84 and may be readily disassembled.

Thus, it can be seen from the foregoing detailed specification and drawings that the present invention provides a novel method and apparatus for treating continuous strip material which is simple and relatively efficient to operate and which is readily adaptable to variations in the dimensions of the material so as to provide a high degree of versatility.

The seal construction and the overall assembly are relatively simple, rugged, relatively economical to fabricate, and are relatively simple to repair or modify. The method and apparatus are particularly adapted to the welding of continuous strip materials by a beam of high-energy charged particles under vacuum so as to produce a continuous composite strip having a weld of relatively narrow width in a manner which is operable at high speed and relatively trouble free. Thus, continuous strip material may be economically treated under substantially optimum conditions.

Since the seal inserts move normally to the strip material only when there is a dimensional inaccuracy in the strip material and since a clearance would normally be provided about the strip material for proper dimensioning of the aperture, there is but little pressure applied to the strip material passing therethrough. Moreover, the seal inserts may be fabricated from a hard, wear-resistant metal alloy to minimize wear thereof and provide long life. Since the strip material is travelling through the apparatus, and particularly the discharing assembly, in a substantially rectilinear path, flexing of the strip is substantially eliminated and the likelihood of contact with the seal inserts minimized.

Having thus described the invention, we claim:

1. In an apparatus for treating continuous strip material under a vacuum, the combination comprising: a work unit providing a vacuum processing chamber in which continuous strip material may be treated; a receiving assembly having a passage extending therethrough communicating with the atmosphere on its inlet side and with said processing chamber on its outlet side, said receiving assembly being adapted to receive continuous strip material at atmospheric pressure at said inlet side and to discharge the continuous strip material under a partial vacuum into said processing chamber, said receiving assembly having a plurality of vacuum inlet chambers in which the air pressure is decreased toward said processing chamber; a discharging assembly having a passage extending therethrough communicating with said processing chamber on its inlet side and with the atmosphere on its outlet side, said discharging assembly being adapted to receive the continuous strip material from said processing chamber under a partial vacuum at said inlet side and to discharge said continuous strip material to atmospheric pressure, said discharging assembly having a plurality of vacuum outlet chambers wherein the air pressure increases toward said outlet thereof; sealing means between adjacent inlet and outlet vacuum chambers each having a pair of split housing members configured to define a mounting aperture therebetween, resilient means in said mounting aperture and a pair of sealing members disposed in said mounting aperture with said resilient means providing resilient support for said sealing members, the opposed surfaces having aligned grooves therein forming an aperture for the passage of the continuous strip material therethrough and minimizing air leakage therethrough about said strip material, said sealing means being adapted to permit sliding movement therethrough of the continuous strip material, said resilient means permitting movement of said sealing members generally normal to the passage of the strip material therethrough to accommodate minor variations in the thickness thereof; and evacuating means communicating with said inlet and outlet chambers for removing air therefrom to establish the desired decrease in pressure toward said work processing chamber from the atmosphere in both said receiving and said discharging assemblies.

2. The apparatus of claim 1 wherein said resilient means is resiliently deflectable sheet material disposed between the remote faces of said sealing members and said split housing members.

3. The apparatus of claim 1 wherein said pair of sealing members are fabricated from hard, wear-resistant metal.

4. The apparatus of claim 1 wherein said receiving assembly has guide means adjacent said inlet side of said passage therein and wherein said discharging assembly has guide means adjacent said outlet side of said passage therein for guiding the continuous strip material through said apparatus.

5. The apparatus of claim 1 wherein said work unit is an electron-beam welder.

6. The apparatus of claim 1 wherein said sealing means includes a gasket member extending over the inner surface of said sealing means to gasket the juncture of said split housing members and sealing members.

7. The apparatus of claim 1 wherein said passages of said discharging assembly and receiving assembly are substantially aligned to provide substantially rectilinear movement of the strip material through said apparatus.

8. The apparatus of claim 1 wherein said sealing means includes a tubular member mounted at one end on a casing member providing a vacuum chamber and means engaging said pair of split housing members within the other end of said tubular member.

9. The apparatus of claim 1 wherein said receiving and discharging assemblies are each comprised of a plurality of casing members providing vacuum chambers, each of said casing members having a fitting for connection to a means for drawing a vacuum, a removable cover providing an opening for access to the vacuum chamber, and means securing the casing member to the adjacent component of the apparatus.

10. In an apparatus for treating continuous strip material under a vacuum, the combination comprising: a work unit providing a vacuum processing chamber in which continuous strip material may be treated; a receiving assembly having a passage extending therethrough communicating with the atmosphere on its inlet side and with said processing chamber on its outlet side, said receiving assembly being adapted to receive continuous strip material at atmospheric pressure at said inlet side and to discharge the continuous strip material under a partial vacuum into said processing chamber, said receiving assembly being comprised of a plurality of casing members each having a vacuum chamber therein, a fitting for connection to a means for drawing a vacuum therein, a removable cover providing an opening for access to said vacuum chamber, and means securing the said casing member to the adjacent components of the apparatus, the air pressure in said receiving assembly in said vacuum chambers being decreased toward said processing chamber; a discharging assembly having a passage extending therethrough communicating with said processing chamber on its inlet side and with the atmosphere on its outlet side, said discharging assembly being adapted to receive the continuous strip material from said processing chamber under a partial vacuum at said inlet side and to discharge said continuous strip material to the atmosphere, said discharging assembly and said receiving assembly being comprised of a plurality of casing members each having a vacuum chamber therein, a fitting for connection to a means for drawing a vacuum therein; sealing means between adjacent vacuum chambers of said receiving and discharging assemblies, said sealing means including a pair of split housing members configured to define a mounting aperture therebetween, a pair of sealing members in said mounting aperture with opposed surfaces having aligned grooves therein forming an aperture for the passage of the continuous strip material therethrough dimensioned and configured to minimize air leakage therethrough about the strip material and to permit sliding movement of the continuous strip material, and resilient means in said mounting aperture between said sealing members and split housing members providing resilient support for said sealing members to permit movement thereof generally normal to the strip material to accommodate minor variations in the thickness of the continuous strip material; and evacuating means communicating with said fittings of said casing members of said receiving and discharging assemblies for removing air from the vacuum chambers to establish the desired decrease in pressure toward said work processing chamber from the atmosphere in both said receiving and said discharging assemblies.

11. The apparatus of claim 10 wherein said receiving assembly has guide means adjacent said inlet side of said passage therein and wherein said discharging assembly has guide means adjacent said outlet side of said passage therein for guiding the continuous strip material through said apparatus.

12. The apparatus of claim 11 wherein said guide means and sealing means are substantially aligned to provide substantially rectilinear movement of the strip material through said apparatus.

13. The apparatus of claim 10 wherein said sealing means includes a tubular member mounted at one end thereof on said casing member and receiving said pair of split housing members within said other end of said tubular member and means engaging said split housing members.

14. The apparatus of claim 10 wherein said sealing means includes a gasket member extending over the inner surface and gasketing the juncture of said split housing members and said sealing members.

15. The apparatus of claim 11 wherein the continuous strip material passing into the receiving assembly is provided by a pair of continuous strips and wherein said work unit is an electron-beam welder and contains a guide fixture for maintaining the pair of continuous strips with their opposed edges in abutment for welding thereof by an electron beam.

16. In the method of welding continuous strip material, the steps comprising: initially passing two continuous strips of material through guide means to place said continuous strips in abutting edge relationship; passing said continuous strips in abutting edge relationship into a work processing chamber through a series of inlet vacuum chambers separated by sealing means providing an aperture for sliding movement of said strip material and minimizing air leakage therethrough about said strip material; subjecting the abutting edges of said continuous strips to a high energy beam in said work processing chamber under a substantial vacuum to weld said strips into a composite strip; withdrawing said composite strip of material from said work processing chamber through a series of outlet vacuum chambers separated by sealing means providing an aperture for sliding movement of said strip material and minimizing air leakage therethrough about said strip material; passing said composite strip material through a second guide means after passage through said series of outlet vacuum chambers so that said first-mentioned and second guide means cooperate to guide said continuous strip through said inlet and outlet vacuum chambers and said work processing chamber in edge-to-edge abutting relationship of the two strips prior to welding thereof; and withdrawing air from said inlet and outlet vacuum chambers so as to decrease the air pressure therein toward said work processing chamber to provide a substantial vacuum therein.

17. The method of claim 16 wherein said strip material moves substantially rectilinearly through the inlet vacuum chambers, work processing chamber and outlet vacuum chambers to prevent substantially any undue flexure thereof.

References Cited

UNITED STATES PATENTS

| 2,793,282 | 5/1957 | Steigerwald | 219—121 |
| 3,183,563 | 5/1965 | Smith | 219—121 |
| 3,219,792 | 11/1965 | Pederson | 219—121 |
| 3,301,993 | 1/1967 | Boyd et al. | 219—121 |
| 3,325,620 | 6/1967 | Hunt et al. | 219—121 |

FOREIGN PATENTS 634,718    11/1963    Belgium.

RICHARD M. WOOD, *Primary Examiner.*

W. DEXTER BROOKS, *Assistant Examiner.*